US011772498B2

(12) United States Patent
Oguro et al.

(10) Patent No.: US 11,772,498 B2
(45) Date of Patent: Oct. 3, 2023

(54) VEHICLE

(71) Applicant: SUBARU CORPORATION, Tokyo (JP)

(72) Inventors: Chihiro Oguro, Tokyo (JP); Motohiro Tanaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 160 days.

(21) Appl. No.: 17/126,742

(22) Filed: Dec. 18, 2020

(65) Prior Publication Data

US 2021/0221235 A1 Jul. 22, 2021

(30) Foreign Application Priority Data

Jan. 17, 2020 (JP) ................................. 2020-005598

(51) Int. Cl.
*B60L 15/00* (2006.01)
*B60L 15/20* (2006.01)
*H02P 23/20* (2016.01)

(52) U.S. Cl.
CPC .............. *B60L 15/20* (2013.01); *H02P 23/20* (2016.02)

(58) Field of Classification Search
CPC .. B60L 15/20; B60L 15/2045; B60L 2240/16; B60L 2240/80; H02P 23/20; Y02T 10/64; Y02T 10/72
See application file for complete search history.

(56) References Cited

U.S. PATENT DOCUMENTS

| 2011/0191010 A1* | 8/2011 | Russ | F02D 41/0065 |
| | | | 701/108 |
| 2012/0059539 A1* | 3/2012 | Arnett | B60W 10/26 |
| | | | 903/903 |
| 2015/0217767 A1* | 8/2015 | Kelly | B60W 10/04 |
| | | | 701/93 |

(Continued)

FOREIGN PATENT DOCUMENTS

| JP | S64-74004 A | 3/1989 |
| JP | 2014-072974 A | 4/2014 |

OTHER PUBLICATIONS

Japanese Office Action dated Jul. 18, 2023, in corresponding Japanese Patent Application No. 2020-005598, with an English translation thereof.

Primary Examiner — Jacob M Amick
Assistant Examiner — Sherman D Manley
(74) Attorney, Agent, or Firm — McGinn I.P. Law Group, PLLC

(57) ABSTRACT

A vehicle includes a power source, a requested driving force calculator, and an actual driving force calculator, and a driving controller. The requested driving force calculator calculates a requested driving force on the basis of a driving operation. The actual driving force calculator calculates an actual driving force following the requested driving force, while limiting a rate of change in the actual driving force. The driving controller controls the power source to output the actual driving force calculated. The actual driving force calculator changes the rate of change in the actual driving force, on the basis of a difference between the requested driving force and the actual driving force, and a lapsed time of limiting the rate of change in the actual driving force.

18 Claims, 9 Drawing Sheets

(56) References Cited

U.S. PATENT DOCUMENTS

| | | | |
|---|---|---|---|
| 2015/0352975 A1* | 12/2015 | Jung | B60L 3/12 |
| | | | 701/22 |
| 2016/0121754 A1* | 5/2016 | Hakala | B60K 31/04 |
| | | | 701/22 |
| 2020/0139822 A1* | 5/2020 | Kaneko | B60L 7/18 |
| 2020/0139903 A1* | 5/2020 | Kamio | H02P 29/027 |
| 2021/0237586 A1* | 8/2021 | Oguro | B60L 15/2009 |

* cited by examiner

VEHICLE

CROSS-REFERENCE TO RELATED APPLICATIONS

This application claims priority from Japanese Patent Application No. 2020-005598 filed on Jan. 17, 2020, the entire contents of which are hereby incorporated by reference.

BACKGROUND

The disclosure relates to a vehicle including an actual driving force calculator that calculates an actual driving force following a requested driving force, while limiting a rate of change in the actual driving force.

Vehicles such as an EV (Electric Vehicle) and an HEV (Hybrid Electric Vehicle) travel by motive power from an electric motor. In such vehicles, generally, a controller calculates a requested driving force and an actual driving force. The requested driving force is based on a driving operation. The actual driving force follows the requested driving force, with a rate of change in the actual driving force being limited. Thus, a driving control of the electric motor is carried out, to generate the actual driving force thus calculated. Limiting the rate of change in the requested driving force makes it possible to alleviate a rapid change in a driving force to be outputted from the electric motor even in a case with an abrupt driving operation. It is to be noted that the term "driving force" as mentioned above may be replaced with "torque".

Various proposals have been made for processing of limiting the rate of change in the requested driving force. For example, Japanese Unexamined Patent Application Publication (JP-A) No. 2014-072974 discloses a configuration as follows. Requested torque is calculated on the basis of a driving operation. In a case where a rate of change in the requested torque thus calculated is higher than an upper limit, the rate of change is limited to the upper limit or lower, to calculate actual torque.

SUMMARY

An aspect of the technology provides a vehicle including a power source, a requested driving force calculator, an actual driving force calculator, and a driving controller. The power source is configured to generate motive power. The requested driving force calculator is configured to calculate a requested driving force on the basis of a driving operation. The actual driving force calculator is configured to calculate an actual driving force following the requested driving force, while limiting a rate of change in the actual driving force. The driving controller is configured to control the power source to output the actual driving force calculated. The actual driving force calculator is configured to change the rate of change in the actual driving force, on the basis of a difference between the requested driving force and the actual driving force, and a lapsed time of limiting the rate of change in the actual driving force.

An aspect of the technology provides a vehicle including a power source and circuitry. The power source is configured to generate motive power. The circuitry is configured to calculate a requested driving force on the basis of a driving operation. The circuitry is configured to calculate an actual driving force following the requested driving force, while limiting a rate of change in the actual driving force. The circuitry is configured to control the power source to output the actual driving force calculated. The circuitry is configured to change the rate of change in the actual driving force, on the basis of a difference between the requested driving force and the actual driving force, and a lapsed time of limiting the rate of change in the actual driving force.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
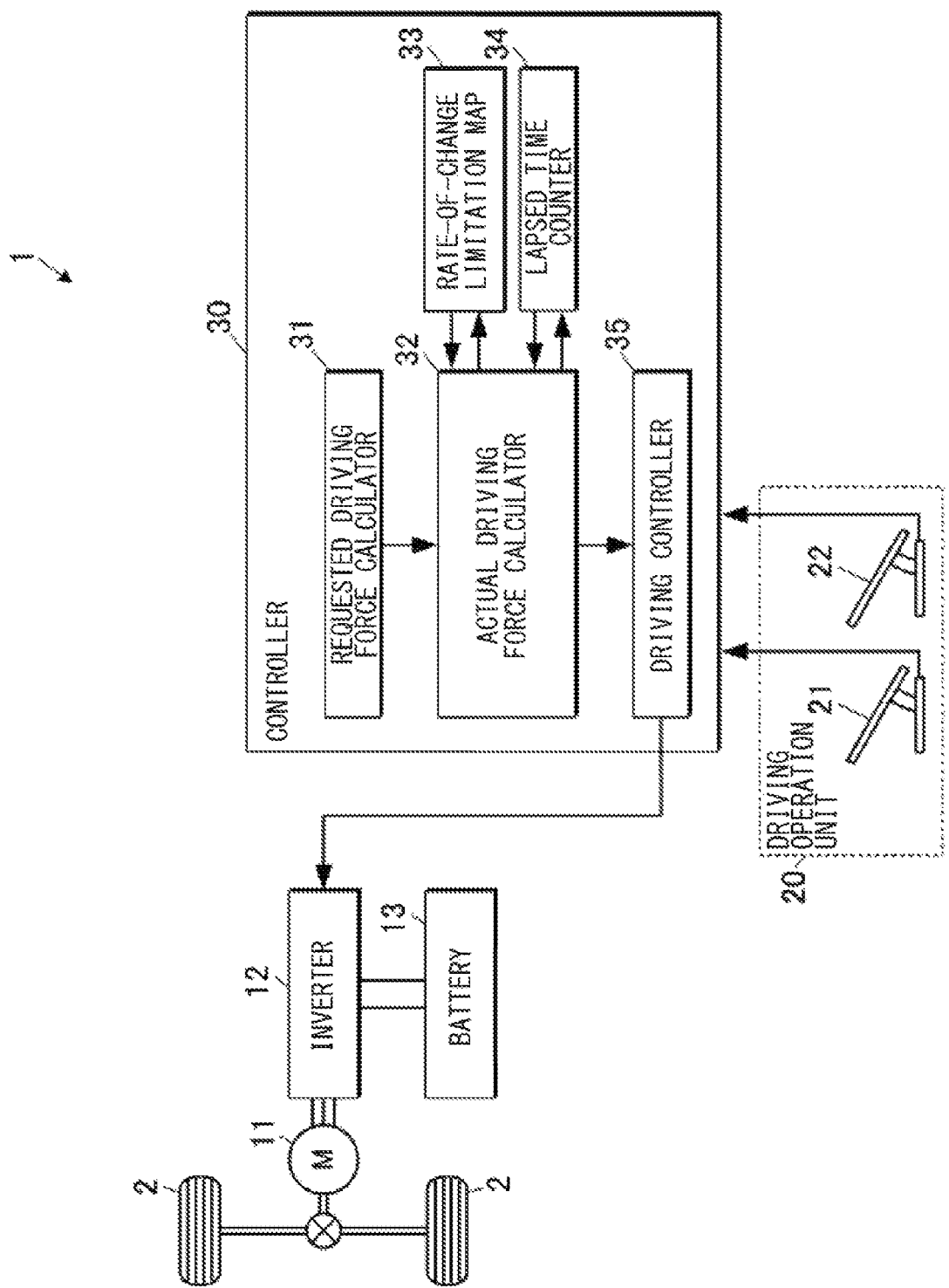
FIG. 1 is a block diagram of a vehicle according to a first embodiment of the disclosure.

Existing processing of limiting a rate of change in a driving force has had room for improvement. For example, in one configuration, uniform limitation is imposed on a rate of change in a requested driving force changing rapidly. This configuration has difficulties in limiting the rate of change in accordance with a driving state. In another configuration, a plurality of kinds of different limitation processing is used in accordance with a driving state, to reduce the rate of change in the actual driving force. Such a configuration involves complicated calculation processing of the actual driving force.

It is desirable to provide a vehicle that makes it possible to limit a rate of change in a driving force in accordance with a driving state, by simple calculation processing.

In the following, some embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

First Embodiment

FIG. 1 is a block diagram of a vehicle according to a first embodiment of the disclosure. The vehicle 1 in this embodiment may be, for example, an EV, and include driving wheels 2 and a traveling motor 11, an inverter 12, a battery 13, a driving operation unit 20, and a controller 30. The traveling motor 11 may generate motive power for the driving wheels 2. The inverter 12 may drive the traveling motor 11. The battery 13 may supply electric power to drive the traveling motor 11. The driving operation unit 20 may include an accelerator pedal 21 and a brake pedal 22. The controller 30 may be supplied with an operation signal from the driving operation unit 20, and carry out a driving control of the inverter 12. In one embodiment of the disclosure, the traveling motor 11 may serve as an "electric motor".

The controller 30 may include a single ECU (Electronic Control Unit), or alternatively, the controller 30 may have a configuration in which a plurality of ECUs communicates with one another to operate in cooperation with one another. The controller 30 may include a ROM (Read Only Memory) and a CPU (Central Processing Unit). The ROM may hold control programs. The CPU may perform calculation processing. The CPU may execute the control programs, to provide a plurality of modules. The plurality of the modules may include a requested driving force calculator 31, an actual driving force calculator 32, a rate-of-change limitation map 33, a lapsed time counter 34, and a driving controller 35. The requested driving force calculator 31 may calculate a requested driving force on the basis of the operation signal from the driving operation unit 20. The actual driving force calculator 32 may calculate an actual driving force following the requested driving force, while limiting a rate of change in the actual driving force. The rate of change means an amount of change per unit time. The rate-of-change limitation map 33 and the lapsed time counter 34 may be used by the actual driving force calculator 32 in calculating the actual driving force. The driving controller 35 may make a driving control of the inverter 12, to allow the actual driving force calculated by the actual driving force calculator 32 to be outputted from the traveling motor 11.

The requested driving force calculator 31 may calculate the requested driving force in accordance with an amount of operation of, for example, the accelerator pedal 21 or the brake pedal 22. The requested driving force may range from a requested driving force of a positive value in a case where the accelerator pedal 21 is operated, to a requested driving force of a negative value in a case where the brake pedal 22 is operated. A configuration may be adopted in which operating the accelerator pedal 21 causes both acceleration and braking. In this case, the requested driving force calculator 31 may calculate the requested driving force as zero in a case where the amount of operation of the accelerator pedal 21 is a reference amount of operation. As the amount of operation becomes greater than the reference amount of operation, the requested driving force calculator 31 may calculate the requested driving force as a positive and greater value. As the amount of operation becomes smaller than the reference amount of operation, the requested driving force calculator 31 may calculate the requested driving force as a negative and smaller value. An abrupt operation of the driving operation unit 20 by a driver causes a rapid change in the requested driving force.

The actual driving force calculator 32 may receive the requested driving force from the requested driving force calculator 31, and calculate the actual driving force following the requested driving force. In a case where a difference between the requested driving force and the actual driving force is equal to or smaller than a first threshold, and the requested driving force changes at a rate of change lower than a predetermined rate of change, the actual driving force calculator 32 may refrain from performing limitation processing on the rate of change, and calculate the actual driving force that substantially matches the requested driving force. In contrast, in a case where the requested driving force changes at a rate of change equal to or higher than the predetermined rate of change, the actual driving force calculator 32 may start the limitation processing on the rate of change in the actual driving force, and calculate the actual driving force deviating from the requested driving force. After the start of the limitation processing on the rate of change, in a case where the difference between the requested driving force and the actual driving force becomes equal to or smaller than the first threshold again, the actual driving force calculator 32 may end the limitation processing on the rate of change. The first threshold as mentioned above may be set at a difference value at the end of the limitation processing on the rate of change. For example, the first threshold may be set at a maximum difference at which the requested driving force and the actual driving force are considered to substantially match. The first threshold may be set at different values, depending on the requested driving force being a positive value or a negative value, and/or depending on magnitude of the requested driving force.

The lapsed time counter 34 may count a lapsed time during which the actual driving force calculator 32 continues the limitation processing on the rate of change. The lapsed time may be reset on the condition that an absolute value of the difference between the requested driving force and the actual driving force becomes equal to or smaller than the first threshold. For example, the lapsed time may be reset at the start or the end of the limitation processing on the rate of change. The counting of the lapsed time may be continued from a start of continuation of the limitation processing. For example, the lapsed time counter 34 may be a software timer, or alternatively, the lapsed time counter 34 may be a hardware timer.

Figure 2:
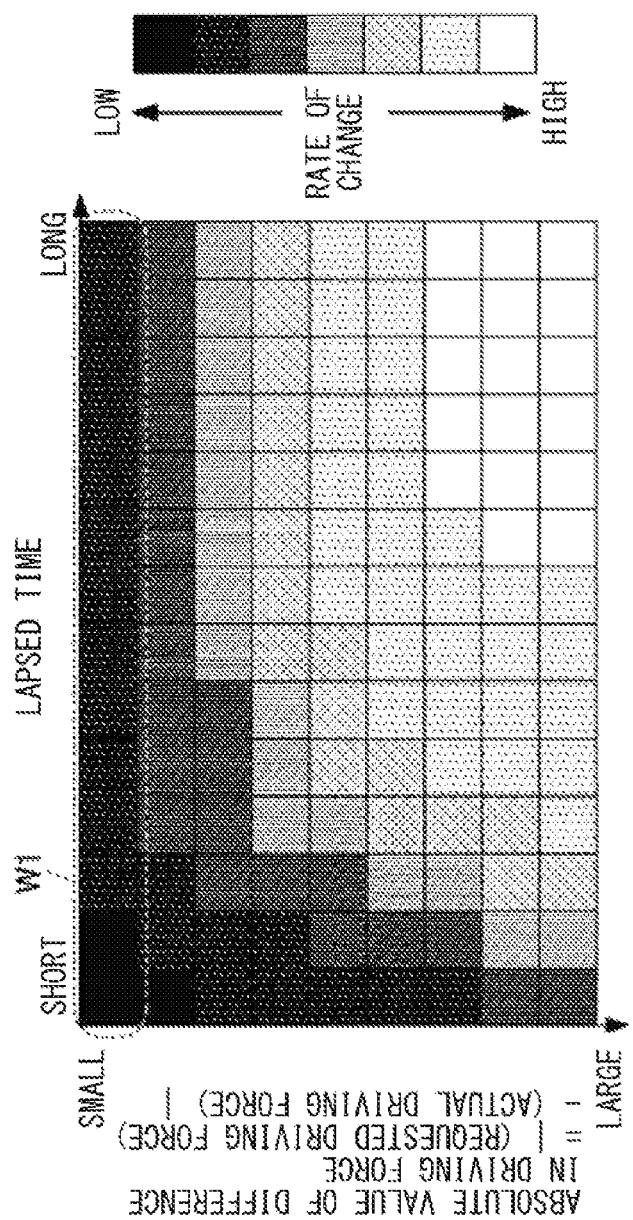
FIG. 2 illustrates an example of a rate-of-change limitation map.

FIG. 2 illustrates an example of the rate-of-change limitation map 33. During execution of the limitation processing on the rate of change, the actual driving force calculator 32 changes the rate of change in the actual driving force, on the basis of the difference between the requested driving force and the actual driving force, and the lapsed time of the limitation processing counted by the lapsed time counter 34. The difference between the requested driving force and the actual driving force is hereinafter simply referred to as the difference in the driving force. The lapsed time of the limitation processing is hereinafter simply referred to as the lapsed time. The rate-of-change limitation map 33 is map data summarizing their relation. As summarized in FIG. 2, the rate-of-change limitation map 33 may provide setting of the rate of change as follows. As the absolute value of the difference in the driving force becomes smaller and the lapsed time becomes shorter, the rate of change becomes lower. As the absolute value of the difference in the driving force becomes greater and the lapsed time becomes longer, the rate of change becomes higher. Moreover, the rate-of-change limitation map 33 may provide the setting of the rate of change as follows. Focusing on the same row of the absolute value of the difference in the driving force, as the lapsed time becomes longer, the rate of change becomes higher. Focusing on the same column of the lapsed time, as the absolute value of the difference in the rate of change becomes greater, the rate of change becomes higher. Furthermore, the rate-of-change limitation map 33 may provide the setting of the rate of change as follows. The rate of change in a range W1 where the absolute value of the difference in the driving force is small has a smaller ratio of change in the rate of change with respect to the lapsed time, than the rate of change in a range where the absolute value of the difference in the driving force is great. With the forgoing setting of the range W1, in a case where the difference in the driving force is small, the rate of change is kept low even if the lapsed time becomes longer.

In the limitation processing on the rate of change, the actual driving force calculator 32 may refer to the rate-of-change limitation map 33, and determine the rate of change, on the basis of the difference in the driving force calculated on a previous control cycle, and the lapsed time. Furthermore, the actual driving force calculator 32 may add an amount of change that has the determined rate of change and is directed to follow the requested driving force, to the actual driving force calculated on the previous control cycle, to calculate the actual driving force on the next control cycle. However, in a case where changing the actual driving force at the rate of change thus determined causes the actual driving force to be greater or smaller than the requested driving force, the actual driving force calculator 32 may calculate the actual driving force as a value that matches, or substantially matches, the requested driving force.

The driving controller 35 may receive the actual driving force from the actual driving force calculator 32, and control the inverter 12 to allow the actual driving force to be outputted from the traveling motor 11.

First Operation Example

Figure 3:
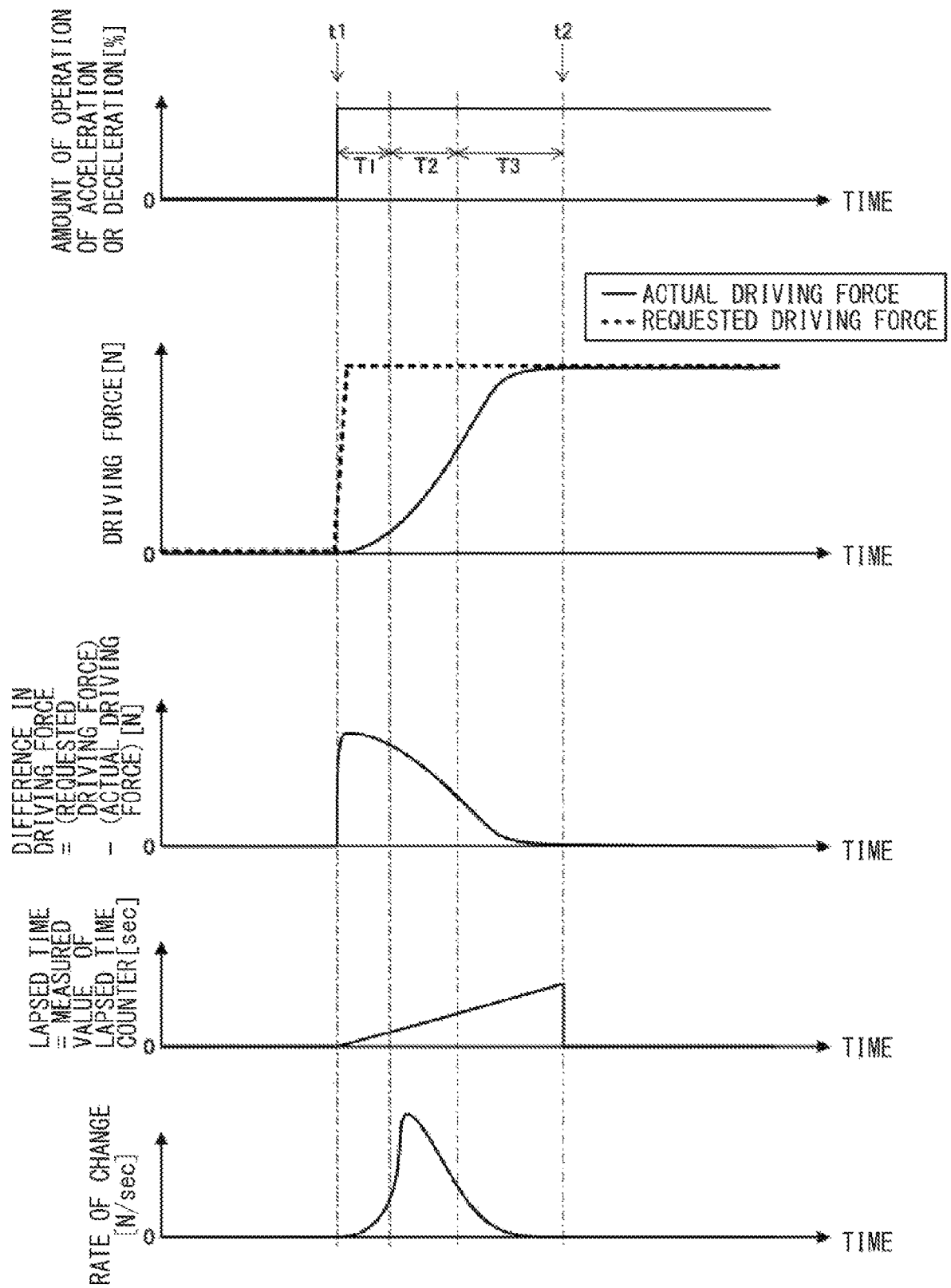
FIG. 3 is a timing chart of a first operation example of the vehicle according to the first embodiment.

FIG. 3 is a timing chart of a first operation example of the vehicle 1 according to the first embodiment. The first operation example includes operation at a start of the vehicle 1. At the start of the vehicle 1, the accelerator pedal 21 is relatively abruptly stepped on to make an acceleration operation. Thereupon, the requested driving force becomes rapidly greater, causing the start of the limitation processing on the rate of change in the actual driving force calculator 32 (timing t1). The lapsed time counter 34 may count the lapsed time from timing t1 of the start of the limitation processing. In a preliminary term T1 after the start of the limitation processing, the difference between the requested driving force and the actual driving force is great. Meanwhile, since the lapsed time is short, the rate of change to be obtained from the rate-of-change limitation map 33 becomes low. Accordingly, in the preliminary term T1 of the limitation processing, the actual driving force follows the requested driving force at the low rate of change. Limiting the rate of change in the preliminary term T1 makes it possible to prevent the actual driving force from becoming rapidly greater, from a stop when no motive power is transmitted to a motive power transmission mechanism between the traveling motor 11 to the driving wheels 2, to immediately after the start when motive power transmission is started. Hence, it is possible to suppress an impact such as tooth hammer occurring in the motive power transmission mechanism.

In an intermediate term T2 of the limitation processing on the rate of change, while the difference in the driving force remains relatively great, the lapsed time becomes longer. As a result, the rate of change to be obtained from the rate-of-change limitation map 33 becomes high. Accordingly, in the intermediate term T2, the actual driving force becomes close to the requested driving force at the high rate of change. With such a change in the rate of change, it is possible to provide quick acceleration as intended by the driver, in accordance with a driving state at the start of the vehicle 1.

In a final term T3 of the limitation processing on the rate of change, while the lapsed time of the limitation processing becomes long, the difference in the driving force becomes small. As a result, the rate of change to be obtained from the rate-of-change limitation map 33 becomes low. Accordingly, in the final term T3, the actual driving force converges on the requested driving force at the low rate of change. In the driving state at the start of the vehicle 1, the accelerator pedal 21 is operated to allow the actual driving force to be constant, to keep a constant vehicle speed after the start of the vehicle 1. Thus, on the occasion that the actual driving force converges on the requested driving force, the traveling motor 11 and the motive power transmission mechanism make a transition from a motion of increasing the driving force to a motion of stopping the increase in the driving force. In general, an impact on the traveling motor 11 and the motive power transmission mechanism also occurs in a case of an abrupt change in an amount of time change in the driving force. Limiting the rate of change in the final term T3 causes a gradual stop of the increase in the actual driving force. Hence, it is possible to suppress occurrence of such an impact.

Thereafter, the difference between the actual driving force and the requested driving force becomes small, and the limitation processing on the rate of change by the actual driving force calculator 32 may be ended (timing t2). The lapsed time counter 34 may be reset, and the counting may be stopped.

Second Operation Example

Figure 4:
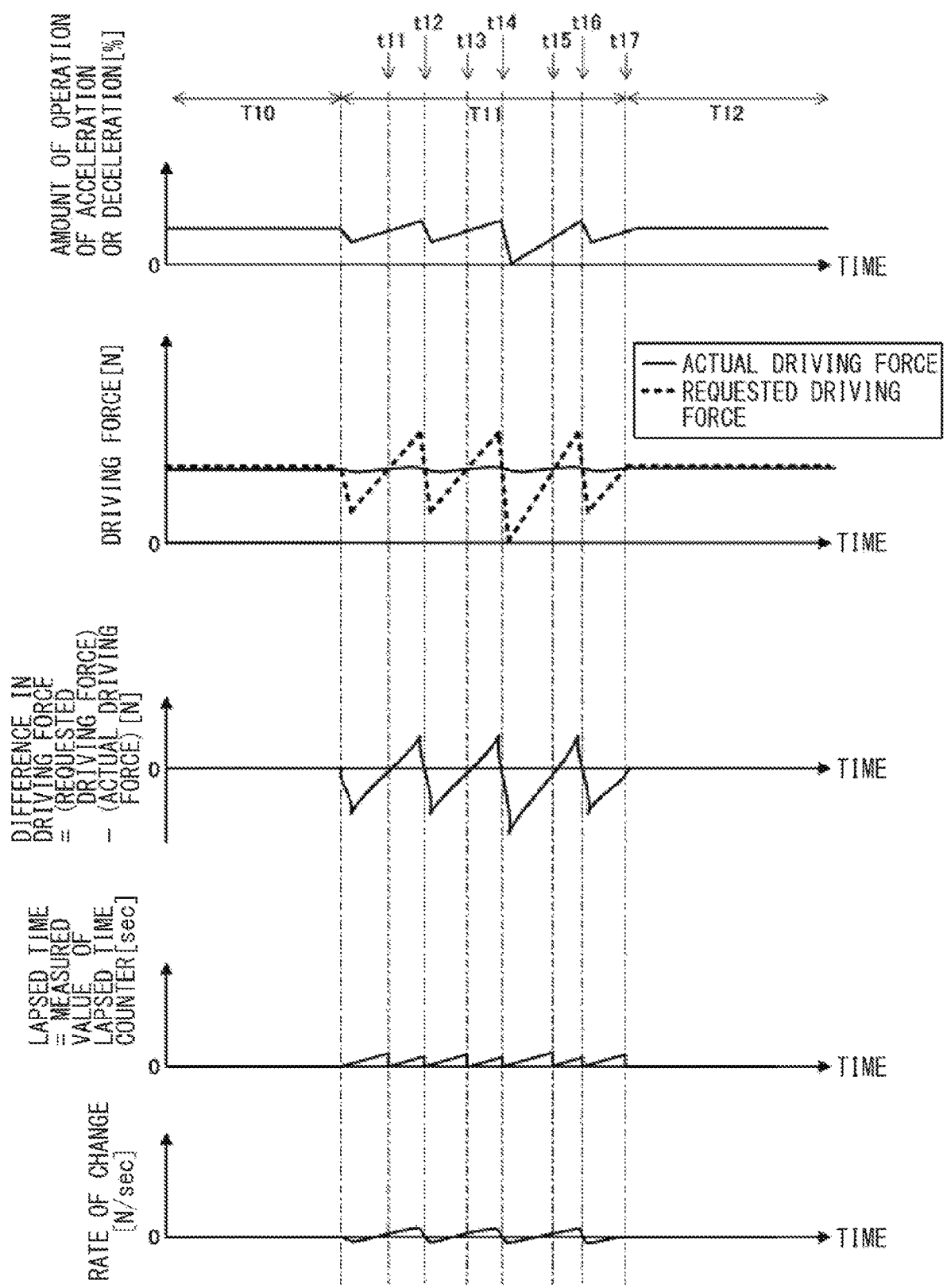
FIG. 4 is a timing chart of a second operation example of the vehicle according to the first embodiment.

FIG. 4 is a timing chart of a second operation example of the vehicle 1 according to the first embodiment. The second operation example includes operation on constant-speed travel of the vehicle 1. On the constant-speed travel, the driver keeps stepping on the accelerator pedal 21 by a constant amount, as in terms T10 and T12. In contrast, as in a term T11, in some cases, the amount of stepping on of the accelerator pedal 21 may fluctuate, or the driver may make small movements of stepping on and off the accelerator pedal 21. Such an operation in the term T11 may cause small changes in magnitude of the requested driving force, which may result in the start of the limitation processing on the rate of change by the actual driving force calculator 32. Even in such a case, however, the small changes in the requested driving force may cause the requested driving force to match the actual driving force at timing t11 to t17 in a short period of time. Thus, the lapsed time of the limitation processing is reset while the lapsed time is short. This keeps the lapsed time from being elongated.

Furthermore, in the case with the fluctuation in the amount of stepping on of the accelerator pedal 21, the difference in the driving force is kept from becoming great. Thus, even in a case where the driving operation during the term T11 causes the execution of the limitation processing on the rat of change, the rate of change to be obtained from the rate-of-change limitation map 33 becomes low, causing no significant change in the actual driving force. In other words, it is possible to keep the constant-speed travel as intended by the driver.

As described, in the vehicle 1 according to the first embodiment, the actual driving force calculator 32 changes the rate of change in the actual driving force on the basis of the difference between the requested driving force and the actual driving force, and the lapsed time of the limitation processing on the rate of change. The lapsed time of the limitation processing is a parameter that optimally reflects the driving state. Hence, it is possible to limit the rate of change in the driving force in accordance with the driving state, by the simple calculation processing by the actual driving force calculator 32.

Moreover, in the vehicle 1 according to the first embodiment, as summarized in the rate-of-change limitation map 33, the actual driving force calculator 32 may lower the rate of change as the difference in the driving force becomes smaller and the lapsed time becomes shorter. The actual driving force calculator 32 may raise the rate of change as the difference in the driving force becomes greater and the lapsed time becomes longer. Thus, at a start of an abrupt acceleration or deceleration operation, it is possible to gradually change the actual driving force, leading to alleviation of an impact on the traveling motor 11 and a motive power transmission path. Furthermore, in a case where a significant acceleration or deceleration operation is continued, it is possible to significantly change the actual driving force as intended by the driver, allowing the actual driving force to quickly become close to the requested driving force.

In addition, in the vehicle 1 according to the first embodiment, the actual driving force calculator 32 may reset the lapsed time counter 34 on the condition that the absolute value of the difference between the requested driving force and the actual driving force becomes equal to or smaller than the first threshold. Thus, it is possible to indicate, by the lapsed time, how long time has lapsed from the state in which the actual driving force becomes close to the requested driving force. By the lapsed time, it is possible to provide the limitation control on the rate of change adaptive to the different driving states such as the start of the vehicle 1 and the constant-speed travel of the vehicle 1.

Moreover, in the vehicle 1 according to the first embodiment, the traveling motor 11 may serve as the power source that generates the motive power of the driving wheels 2. This leads to a shorter delay between the calculation of the actual driving force, and an actual output of the actual driving force to the traveling motor 11. The limitation control of changing the rate of change as described causes the actual driving force calculated to be outputted from the traveling motor 11 with the short delay. Thus, even in a case with various changes in the driving force, it is possible to provide the limitation control on the rate of change in the driving force adaptive to each of the variations in the driving state.

Second Embodiment

The vehicle 1 according to a second embodiment is different from the first embodiment in that a zero-cross control and the limitation control on the rate of change based on the predetermined driving state are added. Otherwise, the vehicle 1 according to the second embodiment is similar to the first embodiment.

Figure 5:
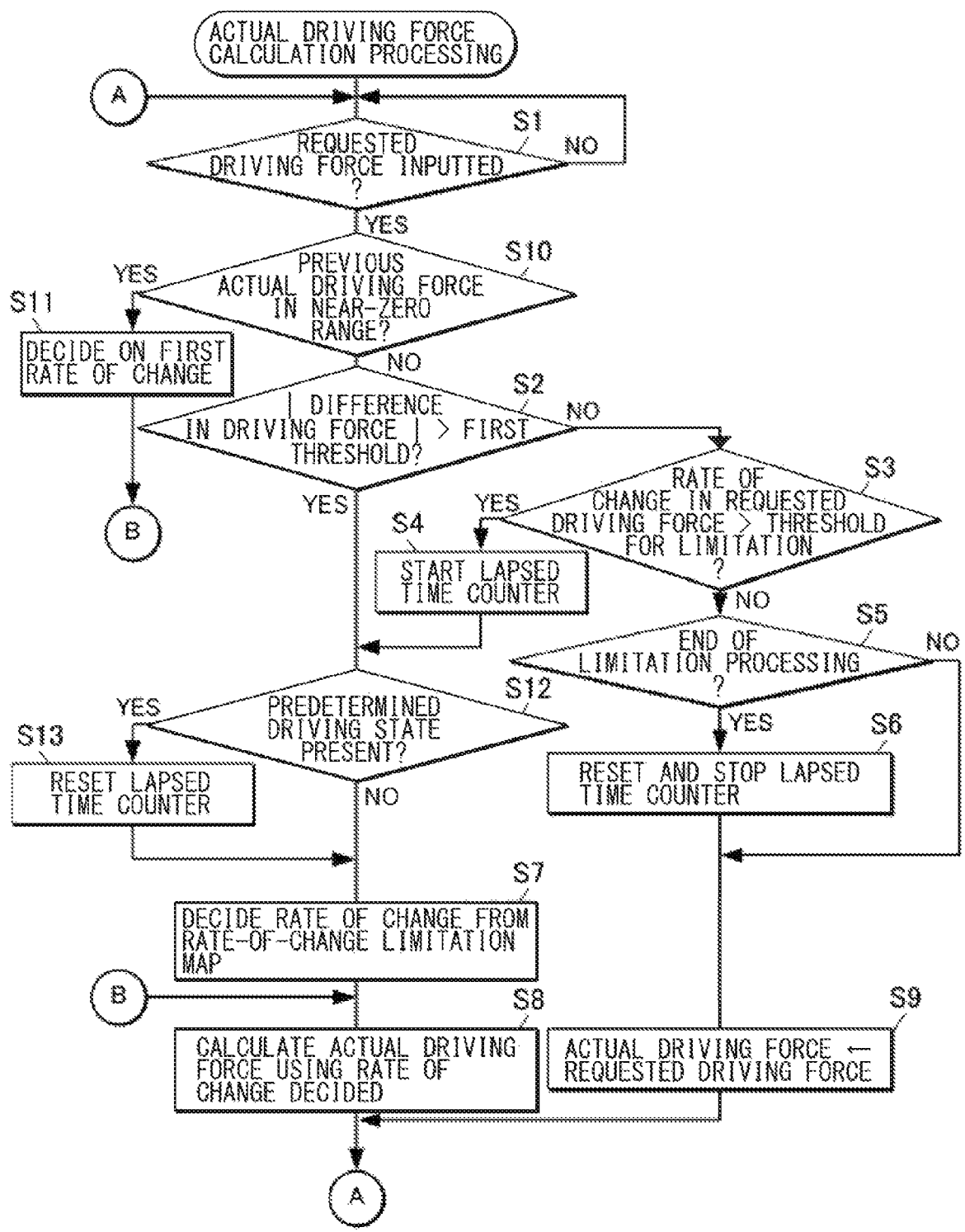
FIG. 5 is a flowchart of control processing by an actual driving force calculator in a vehicle according to a second embodiment of the disclosure.

FIG. 5 is a flowchart of additional control processing by the actual driving force calculator 32 in the vehicle 1 according to the second embodiment. The actual driving force calculator 32 may continuously execute the control processing in FIG. 5, while a system of the vehicle 1 is in operation.

In the second embodiment, the actual driving force calculator 32 may execute, in addition to the control of the rate of change described in the first embodiment (steps S1 to S9), the zero-cross control (steps S10 and S11) and the limitation control on the rate of change corresponding to the predetermined driving state (steps S12 and S13).

Steps S1 to S9 provide the control of the rate of change described in the first embodiment. In step S1, the actual driving force calculator 32 may input the requested driving force. Thereafter, in the determination processes in steps S2, S3, and S5, the actual driving force calculator 32 may make the determination as to whether or not to execute the limitation processing on the rate of change, and the determination as to whether to start the series of the limitation processing or the determination as to whether to end the series of the limitation processing. In ending the series of the limitation processing, the actual driving force calculator 32 may reset and stop the lapsed time counter 34 (step S6). In starting the series of the limitation processing, the actual driving force calculator 32 may start up the lapsed time counter 34 (step S4). In the case where the absolute value of the difference in the driving force is greater than the first threshold (YES in step S2), or in the case where the rate of change in the requested driving force has greater magnitude that necessitates the limitation (YES in step S3), the actual driving force calculator 32 may determine that the limitation processing on the rate of change is in execution. Thereafter, the actual driving force calculator 32 may determine the rate of change from the rate-of-change limitation map 33 (step S7), and calculate the actual driving force at the rate of change determined (step S8). In the case where the actual driving force calculator 32 determines that the limitation processing on the rate of change is not in execution, the actual driving force calculator 32 may calculate the actual driving force that matches the requested driving force (step S9).

The zero-cross control is a control including limiting the rate of change in the driving force on the occasion that the driving force from the traveling motor 11 crosses over zero. On the occasion that the driving force from the traveling motor 11 crosses over zero, there occurs a change in a direction of torque to be transmitted from the traveling motor 11 to the driving wheels 2. This may cause an impact such as tooth hammer in the motive power transmission mechanism from the traveling motor 11 to the driving wheels 2. The zero-cross control is aimed at suppression of such an impact. In the zero-cross control, the actual driving force calculator 32 may determine whether the actual driving force falls within a near-zero range H1 including zero (refer to FIG. 6) (step S10). In a case where the actual driving force falls within the near-zero range H1, the actual driving force calculator 32 may decide the rate of change in the actual driving force to be at a first rate of change (or lower) at which the impact as mentioned above is suppressed (step S11). Thereafter, the actual driving force calculator 32 may calculate the actual driving force at the rate of change thus decided (step S8). It is to be noted that contents of the processing of steps S10 and S11 are merely an example of the zero-cross control. Any method may be adopted as to how to determine whether the conditions are established and how to decide the rate of change, insofar as the actual driving force is calculated that suppresses the impact as mentioned above.

The limitation control on the rate of change corresponding to the predetermined driving state is a control provided for alleviation of a time change in the rate of change, in a driving state in which executing the control of the rate of change based on the difference between the requested driving force and the actual driving force causes an abrupt change in the rate of change in the actual driving force. Non-limiting examples of the predetermined driving state may include a case where an absolute value of the requested driving force is great at the end of the zero-cross control, and a case with additional stepping on of the accelerator pedal at a stage that the actual driving state has not reached the requested driving force, i.e., a case where an operation is made for a stepwise change in an amount of the driving operation for acceleration from a first amount of operation to a second amount of operation. The first amount of operation may be greater than zero. The second amount of operation may be greater than the first amount of operation. In the control of the rate of change, during the limitation processing on the rate of change, the actual driving force calculator 32 may determine presence or absence of the predetermined driving state (step S12). In a case with the presence of the predetermined driving state, the actual driving force calculator 32 may reset the lapsed time counter 34 (step S13). Thereafter, the actual driving force calculator 32 may allow the processing to proceed to step S7, to determine the rate of change from the rate-of-change limitation map 33.

Third Operation Example

Figure 6:
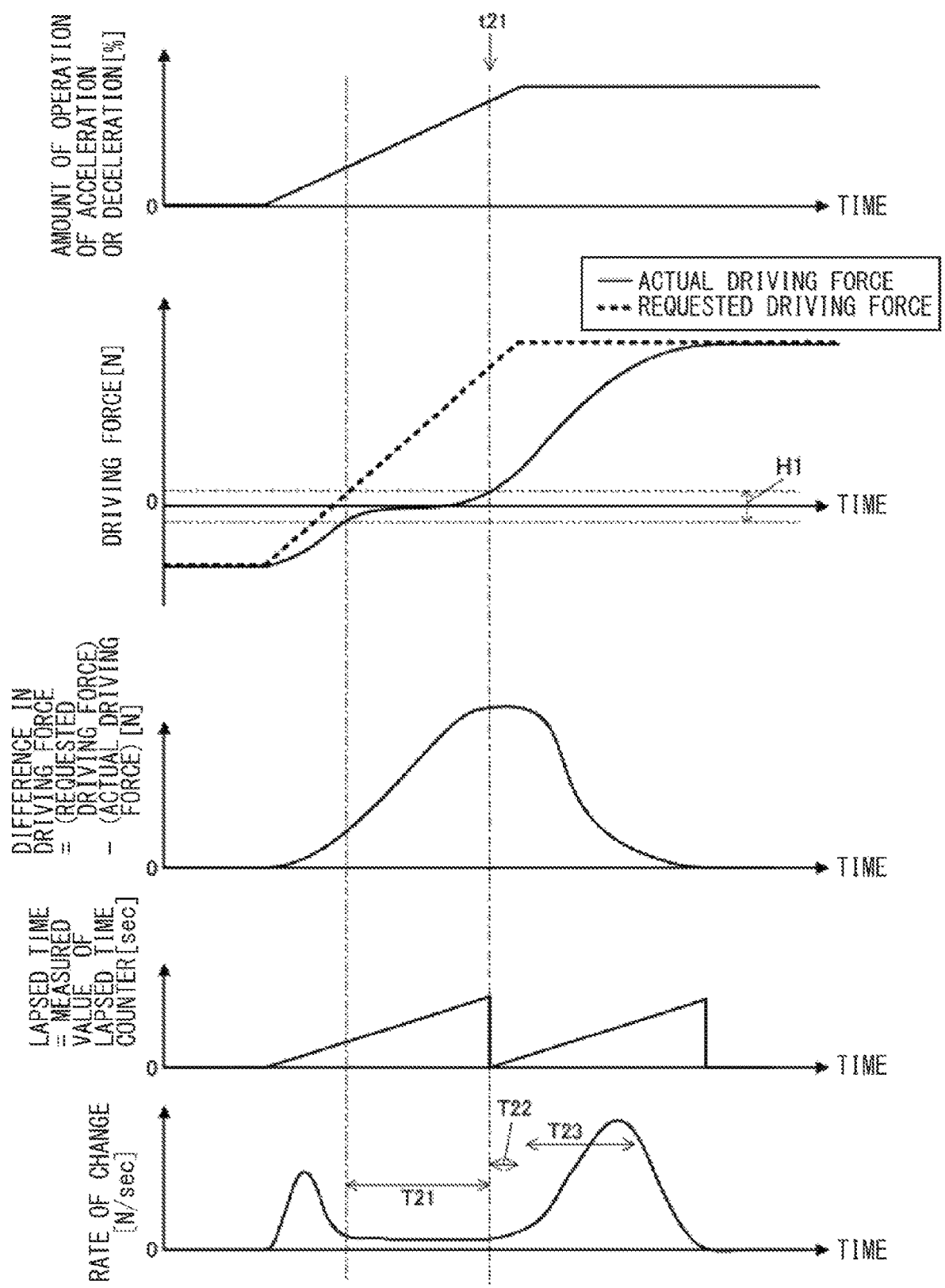
FIG. 6 is a timing chart of an example of operation of the vehicle according to the second embodiment.
Figure 7:
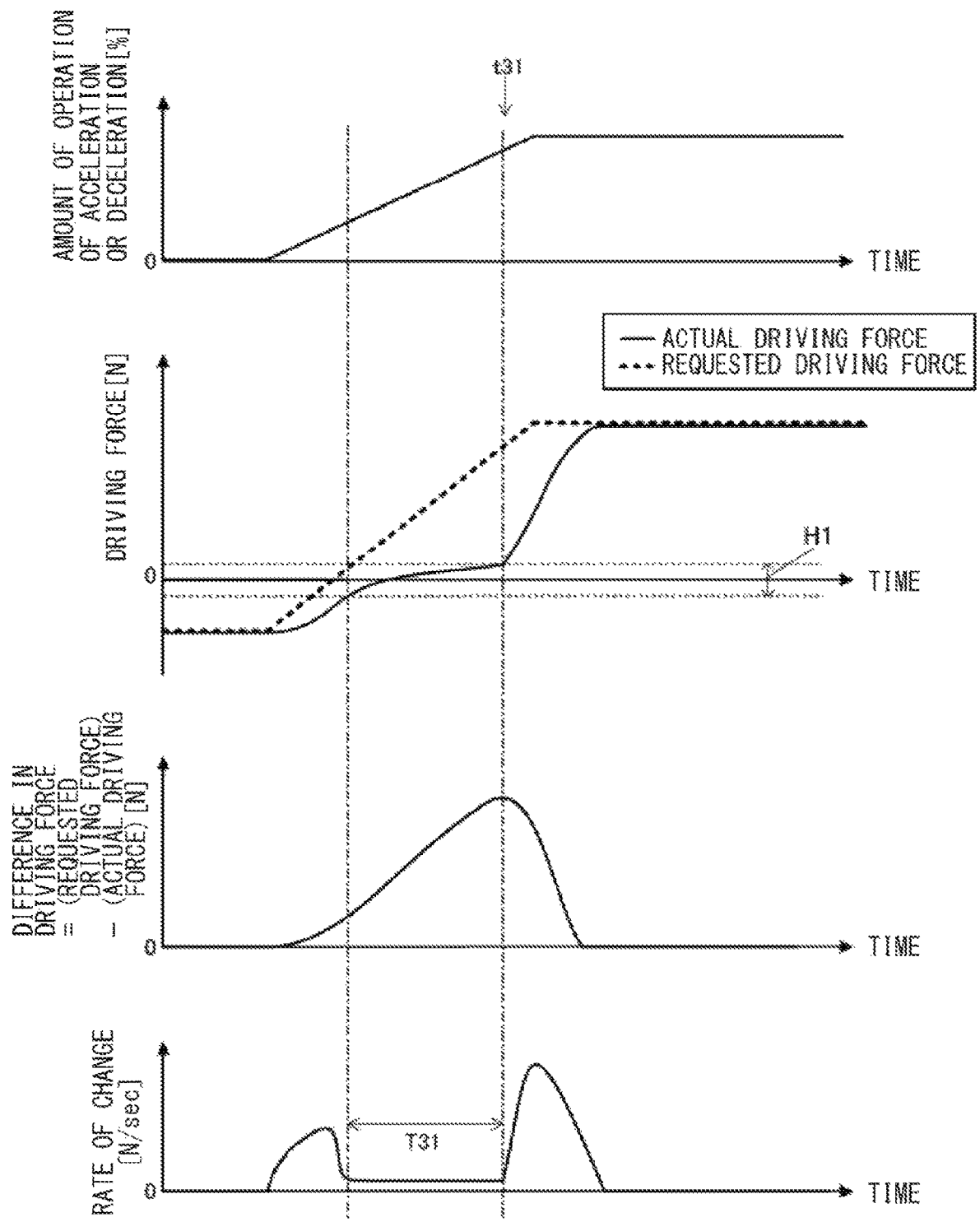
FIG. 7 is a timing chart of a reference example.

FIG. 6 is a timing chart of an example of operation of the vehicle 1 according to the second embodiment. FIG. 7 is a timing chart of a reference example. A third operation example includes operation before and after execution of the zero-cross control. The reference example includes operation of a vehicle devoid of the limitation processing on the rate of change corresponding to the predetermined driving state. In the third operation example, it is assumed that a driving mode is selected in which operating the accelerator pedal 21 causes braking and acceleration operations, i.e., braking power is generated with the amount of operation being zero.

As illustrated in FIG. 7, in a case where the amount of operation of the accelerator pedal 21, or an amount of an acceleration or deceleration operation, increases from zero to a certain value on travel of the vehicle 1, the requested driving force increases in proportion to the amount of operation. The actual driving force also changes from a value for deceleration (regenerative operation of the traveling motor 11) to a value for acceleration (powering operation of the traveling motor 11). In this case, in a term T31 in which the actual driving force falls within the near-zero range H1, an actual driving force calculator in the reference example makes the zero-cross control, to limit the rate of change in the actual driving force to the first rate of change for the zero-cross control. This leads to suppression of the occurrence of the impact on the occasion that the actual driving force crosses over zero.

During the execution of the zero-cross control, in a case where the amount of operation of the accelerator pedal 21 increases or is kept large, the rate of change in the term T31 is controlled at a low value. This causes the difference between the requested driving force and the actual driving force to become greater at a final stage of the term T31. Thereafter, at the end of the zero-cross control, a switching is made to the limitation control in accordance with the difference between the requested driving force and the actual driving force, the rate of change in the actual driving force raises rapidly (timing t31). Such a rapid raise of the rate of change may give the sense of discomfort to the driver.

The operation example in FIG. 6 illustrates a case where driving similar to FIG. 7 is carried out in the vehicle 1 according to the second embodiment. In the vehicle 1 according to the second embodiment as well, the zero-cross control is carried out in a term T21 in which the actual driving force falls within the near-zero range H1, causing the difference in the driving force to become greater at the final stage of the term T21. However, in the vehicle 1 according to the second embodiment, in a case where the actual driving force calculator 32 determines the end of the zero-cross control (step S12 in FIG. 5), the actual driving force calculator 32 may reset the lapsed time counter 34 on the basis of the result of the determination (step S13 in FIG. 5). Thus, the rate of change is decided on the basis of the lapsed time after the reset and on the basis of the difference in the driving force, and the actual driving force is calculated (steps S7 and S8 in FIG. 5).

Resetting the lapsed time counter 34 causes the count of the lapsed time counter 34 to be small at timing t21 of switching from the rate of change in the zero-cross control to the rate of change based on the rate-of-change limitation map 33. Thus, the low rate of change is read from the rate-of-change limitation map 33. Accordingly, in a term T22 immediately after timing t22, an abrupt raise of the rate of change in the actual driving force is avoided. Thereafter, while the difference in the driving force remains great, the lapsed time becomes longer. This causes the rate of change to raise gradually to a greater value (term T23). With such limitation control on the rate of change, the rapid raise of the rate of change as occurs in the reference example in FIG. 7 is eliminated. Hence, it is possible to raise the actual driving force as intended by the driver, without giving the sense of discomfort to the driver.

Fourth Operation Example

Figure 8:
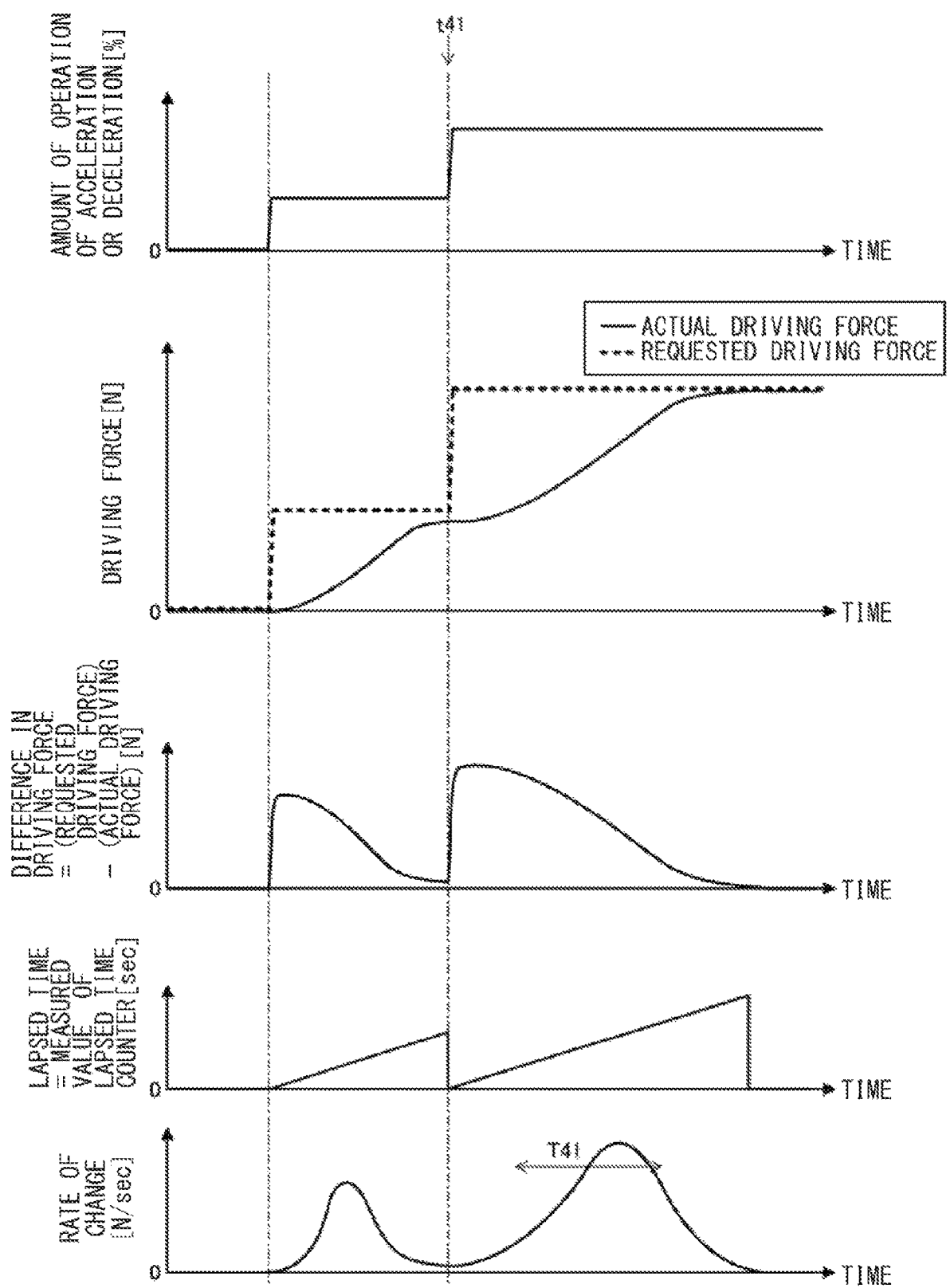
FIG. 8 is a timing chart of an example of the operation of the vehicle according to the second embodiment.
Figure 9:
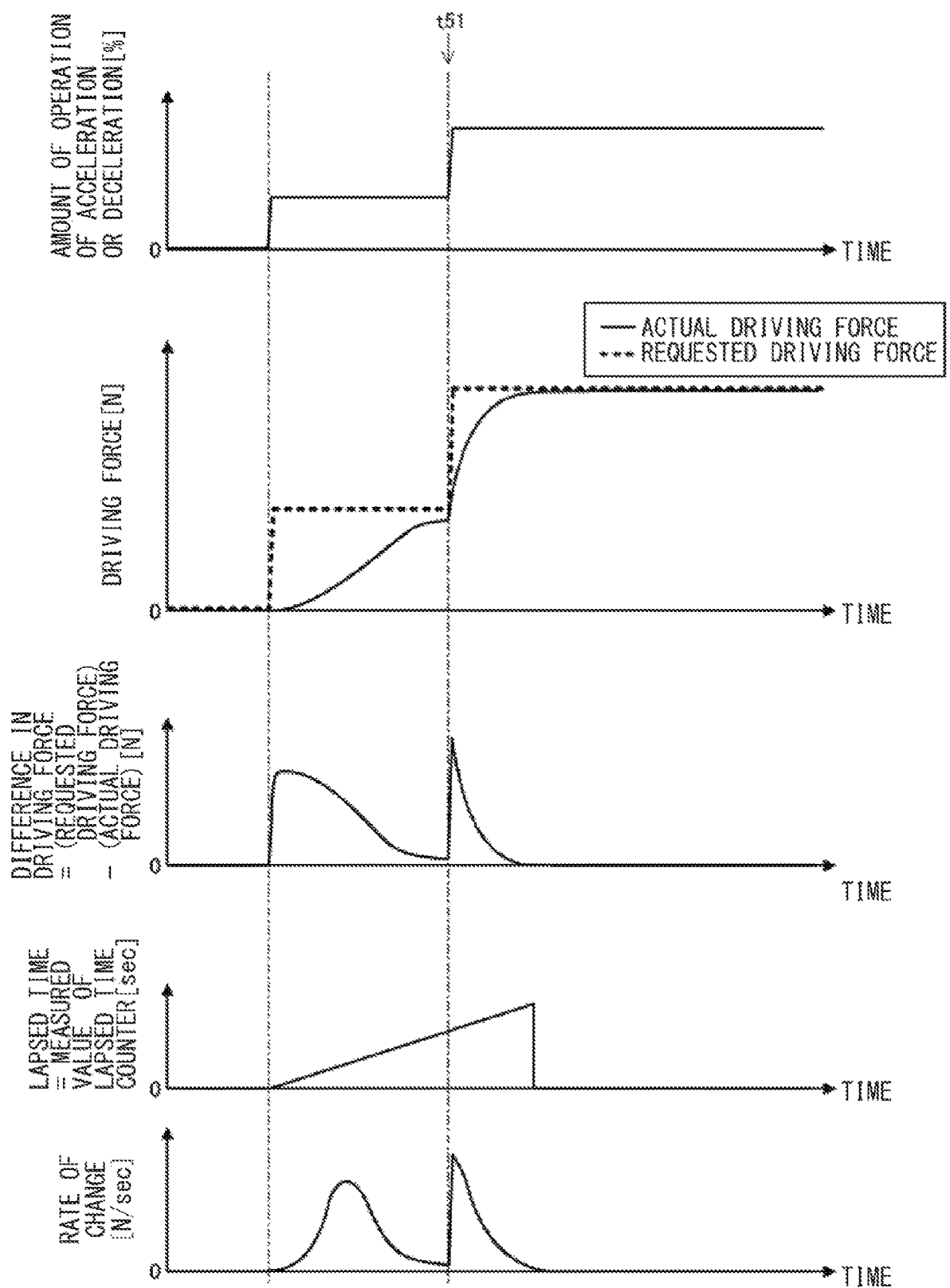
FIG. 9 is a timing chart of a reference example.

FIG. 8 is a timing chart of an example of the operation of the vehicle 1 according to the second embodiment. FIG. 9 is a timing chart of a reference example. A fourth operation example includes the case with the additional stepping on of the accelerator pedal, for example, at the start of the vehicle 1, i.e., the case where the operation is made for the stepwise change in the amount of the driving operation for acceleration from the first amount of operation to the second amount of operation. The first amount of operation may be greater than zero. The second amount of operation may be greater than the first amount of operation. The reference example includes operation in a case without the limitation control on the rate of change corresponding to the predetermined driving state in the second embodiment.

At the time of acceleration such as the start of the vehicle 1, the driver steps on the accelerator pedal 21 by one step, causing the actual driving force to become close to the requested driving force. When the increase in the actual driving force becomes mild, and the driver desires further acceleration, the accelerator pedal 21 may be further stepped on by another step.

As illustrated in FIG. 9, the operation of the accelerator pedal 21 as mentioned above is made, for example, at the start of the vehicle 1, and thereupon, the difference in the driving force raises rapidly immediately after timing t51 of the additional stepping on of the accelerator pedal 21. At this occasion, in the configuration of the reference example, the lapsed time has also become long, causing the rate of change to be obtained from the rate-of-change limitation map 33 becomes high. Thus, a rapid change in the rate of change occurs before and after timing t51. Such a rapid change in the rate of change may give the sense of discomfort to the driver.

FIG. 8 illustrates a case where a driving operation similar to the forgoing is made at the time of acceleration such as the start of the vehicle 1 according to the second embodiment. In the vehicle 1 according to the second embodiment, in the case where the driving operation similar to the forgoing is made, the actual driving force calculator 32 may determine presence or absence of the additional stepping on of the accelerator pedal 21 (step S12 in FIG. 5). On the basis of a result of the determination, the actual driving force calculator 32 may reset the lapsed time counter 34 (step S13 in FIG. 5). Thereafter, the rate of change may be decided on the basis of the lapsed time after the reset and on the basis of the difference in the driving force, and the actual driving force may be calculated (steps S7 and S8 in FIG. 5).

Resetting the lapsed time counter 34 causes the count of the lapsed time counter 34 to lower immediately after timing t41 of the additional stepping on of the accelerator pedal 21. Thus, the low rate of change is read from the rate-of-change limitation map 33. Accordingly, in a term immediately after timing t41, a rapid raise of the rate of change in the actual driving force is avoided. Thereafter, while the difference in the driving force is great, the lapsed time becomes longer, causing the rate of change to raise gradually to a higher value (term T41). With such a limitation control on the rate of change, the rapid raise of the rate of change as occurs in the reference example in FIG. 9 is eliminated. Hence, it is possible to raise the actual driving force as intended by the driver without giving the sense of discomfort to the driver.

As described, in the vehicle 1 according to the second embodiment, the lapsed time counter 34 may be reset, in the case with the determination of the presence of the predetermined driving state in which the limitation control based on the difference between the requested driving force and the actual driving force causes the rapid change in the rate of change in the actual driving force. Accordingly, immediately after the occurrence of the predetermined driving state as mentioned above, the actual driving force calculator 32 may read the rate of change corresponding to the short lapsed time from the rate-of-change limitation map 33, to calculate the actual driving force using the rate of change. Thus, even in the case with the occurrence of the predetermined driving state, it is possible to use the rate of change similar to that immediately after the deviation of the actual driving force from the requested driving force, leading to the suppression of the rapid change in the rate of change in the actual driving force. In one example, resetting the lapsed time counter 34 at the end of the zero-cross control and in the case with the additional stepping on of the accelerator pedal 21 makes it possible to suppress the rapid change in the rate of change in the actual driving force. Hence, it is possible to provide the limitation control on the rate of change in the actual driving force as intended by the driver without giving the sense of discomfort to the driver.

Although some embodiments of the technology are described above by way of example with reference to the accompanying drawings, the technology is by no means limited to the embodiments described above.

For example, in the foregoing embodiments, description is given with the driving force as a target of calculation, but the driving force may be replaced with torque. The driving force and the torque have predetermined relation, and therefore, the configuration with the torque as the target of calculation is regarded equivalent to the configuration with the driving force as the target of calculation.

Moreover, in the forgoing embodiments, the example is described in which the zero-cross control is made in the driving mode in which operating the accelerator pedal 21 allows for the braking operation and the acceleration operation. However, the zero-cross control may be made in a driving mode in which operating the brake pedal 22 and the accelerator pedal 21 allows for the braking operation and the acceleration operation.

Furthermore, in the forgoing embodiments, the configuration is described in which the actual driving force calculator obtains the rate of change in accordance with the difference in the driving force and the lapsed time, using the map data, i.e., the rate-of-change limitation map. However, a configuration may be adopted in which the actual driving force calculator obtains the rate of change in accordance with the difference in the driving force and the lapsed time, using, for example, a mathematical function.

In addition, in the forgoing embodiments, the example is described in which the rate-of-change limitation map with the absolute value of the difference in the driving force as the parameter is used. In this example, the rate of change decided in a case with the difference in the driving force being a positive value and the rate of change decided in the case with the difference in the driving force being a negative value are symmetrical. However, the rate of change to be obtained in accordance with the difference in the driving force and the lapsed time may take asymmetrical values between the case with the difference in the driving force being the positive value and the case with the difference in the driving force being the negative value, and/or between a case with the requested driving force or the actual driving force being a positive value and a case with the requested driving force or the actual driving force being a negative value.

Moreover, in the forgoing embodiments, the example is given in which the vehicle is an EV, but the technology may be applied to an HEV. The technology may be also applied to an engine vehicle in a case with high responsiveness of the control of the driving force.

Furthermore, in the second embodiment, non-limiting examples of the predetermined driving state may include the end of the zero-cross control and the additional stepping on of the accelerator pedal. However, other driving states may be adopted in which executing the control of the rate of change based on the difference between the requested driving force and the actual driving force causes an abrupt change in the rate of change in the actual driving force.

The details described in the forgoing embodiments may be otherwise modified as appropriate, without departing from the scope as defined by the appended claims.

The lapsed time, as a parameter that limits the rate of change in the actual driving force, optimally reflects the driving states. For example, on substantially constant-speed travel, sometimes a constant amount of the operation of the accelerator pedal is continued. Sometimes the amount of the operation of the accelerator pedal fluctuates from the constant amount. Sometimes there is repetition of stepping on and off the accelerator pedal. In either case, the timing when the actual driving force and the requested driving force match occurs in a short period of time. Accordingly, the lapsed time as the parameter that limits the rate of change does not become long. On accelerated travel such as the start of the vehicle, the accelerator pedal is continuously stepped on by a significant amount, causing the requested driving force and the actual driving force to deviate from each other. Accordingly, it takes long time for the actual driving force to match the requested driving force.

According to the aspects of the technology, as described above, the rate of change in the actual driving force is changed using the parameter that reflects the driving state optimally. Hence, it is possible to limit the rate of change in the actual driving force that reflects the driving state optimally. Moreover, the actual driving force calculator changes the rate of change in the actual driving force on the basis of the parameter as mentioned above, and the difference between the requested driving force and the actual driving force. This makes it possible to simplify the calculation processing of the actual driving force. Hence, it is possible to limit the rate of change in the driving force in accordance with the driving state, by the simple calculation processing.

The controller 30 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 30 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle comprising:
   a power source configured to generate motive power;
   a requested driving force calculator configured to calculate a requested driving force on a basis of a driving operation in comparison to a reference amount of operation;
   an actual driving force calculator configured to calculate an actual driving force following the requested driving force, while limiting a rate of change in the actual driving force; and
   a driving controller configured to control the power source to output the actual driving force calculated,
   the actual driving force calculator being configured to change the rate of change in the actual driving force, on a basis of a comparison a first threshold and a difference between the requested driving force and the actual driving force, and a lapsed time of limiting the rate of change in the actual driving force,
   wherein the actual driving, force calculator is configured to make a zero-cross control.

2. The vehicle according to claim 1, wherein the actual driving force calculator is configured to increase the rate of change as the difference is greater and the lapsed time is longer, and decrease the rate of change as the difference is smaller and the lapsed time is shorter.

3. The vehicle according to claim 1, wherein the actual driving force calculator is configured to reset the lapsed time on a condition that an absolute value of the difference between the requested driving force and the actual driving force becomes smaller than the first threshold.

4. The vehicle according to any one of claim 1, wherein the actual driving force calculator is configured to reset the lapsed time on a condition that a predetermined driving state is determined.

5. The vehicle according to any one of claim 1, wherein the power source comprises an electric motor, and the motive power is transmitted from the electric motor to a driving wheel.

6. The vehicle according to claim 1, wherein the actual driving force calculator uses a rate of change limitation map to provide a setting of the rate of change to limit the rate of change.

7. The vehicle according to claim 1, wherein the driving force calculator refers to a rate-of-change limitation map, and determines the rate of change, on a basis of the difference in the driving force calculated on a previous control cycle, and the lapsed time.

8. The vehicle according to claim 1, wherein the actual driving force calculator is configured to dynamically change and limit the rate of change in the actual driving force, on a basis of a dynamic comparison of the difference between the requested driving force and the actual driving force, and the lapsed time of limiting the rate of change in the actual driving force.

9. The vehicle according to claim 1, wherein the actual driving force calculator is configured to provide for acceleration control that accounts for programming during the zero crosses.

10. The vehicle according to claim 1, wherein the actual driving force calculator is configured to change the rate of change in the actual driving force, on a basis of a direct relationship of the difference between the requested driving force and the actual driving force, and the lapsed time of limiting the rate of change in the actual driving force.

11. A vehicle comprising:
    a power source configured to generate motive power;
    a requested driving force calculator configured to calculate a requested driving force on a basis of a driving operation;
    an actual driving force calculator configured to calculate an actual driving force following the requested driving force, while limiting a rate of change in the actual driving force; and
    a driving controller configured to control the power source to output the actual driving force calculated,
    the actual driving force calculator being configured to change the rate of change in the actual driving force, on a basis of a difference between the requested driving force and the actual driving force, and a lapsed time of limiting the rate of change in the actual driving force,
    wherein the actual driving force calculator is configured to reset the lapsed time on a condition that a predetermined driving state is determined,
    the actual driving force calculator is configured to make a zero-cross control that includes limiting the rate of change in the actual driving force on an occasion that the actual driving force crosses over zero, and the predetermined driving state comprises an end of the zero-cross control.

12. A vehicle comprising:
a power source configured to generate motive power;
a requested driving force calculator configured to calculate a requested driving force on a basis of a driving operation;
an actual driving force calculator configured to calculate an actual driving force following the requested driving force, while limiting a rate of change in the actual driving force; and
a driving controller configured to control the power source to output the actual driving force calculated,
the actual driving force calculator being configured to change the rate of change in the actual driving force, on a basis of a difference between the requested driving force and the actual driving force, and a lapsed time of limiting the rate of change in the actual driving force,
wherein the actual driving force calculator is configured to reset the lapsed time on a condition that a predetermined driving state is determined,
the predetermined driving state comprises a stepwise change in an amount of the driving operation of acceleration from a first amount of operation to a second amount of operation, the first amount of operation being greater than zero, and the second amount of operation being greater than the first amount of operation.

13. A vehicle comprising:
a power source configured to generate motive power; and
circuitry configured to
calculate a requested driving force on a basis of a driving operation in comparison to a reference amount of operation,
calculate an actual driving force following the requested driving force, while limiting a rate of change in the actual driving force, and
control the power source to output the actual driving force calculated,
the circuitry being configured to change the rate of change in the actual driving force, on a basis of a comparison of a first threshold and a difference between the requested driving force and the actual driving force, and a lapsed time of limiting the rate of change in the actual driving force,
wherein the circuitry is configured to make a zero-cross control.

14. The vehicle according to claim 13, wherein the circuitry is configured to change the rate of change in the actual driving force, on a basis of a direct relationship of the difference between the requested driving force and the actual driving force, and the lapsed time of limiting the rate of change in the actual driving force.

15. The vehicle according to claim 13, wherein the circuitry is configured to dynamically change and limit the rate of change in the actual driving force, on a basis of a dynamic comparison of the difference between the requested driving force and the ac a driving force, and the lapsed time of limiting the rate of change in the actual driving force.

16. The vehicle according to claim 13, wherein the circuitry s configured to reset the lapsed time on a condition that a predetermined driving state is determined,
wherein the circuitry is configured to make the zero-cross control that includes limiting the rate of change in the actual driving force on an occasion that the actual driving force crosses over zero, and
the predetermined driving state comprises an end of the zero-cross control.

17. The vehicle according to claim 13, wherein the circuitry refers to a rate-of-change limitation map, and determines the rate of change, on a basis of the difference in the driving force calculated on a previous control cycle, and the lapsed time.

18. The vehicle according to claim 13, wherein the circuitry is configured to reset the lapsed time on a condition that an absolute value of the difference between the requested driving force and the actual driving force becomes smaller than the first threshold.

* * * * *